E. F. EDGAR.
STEAM ENGINE.
APPLICATION FILED DEC. 26, 1908.

1,069,607.

Patented Aug. 5, 1913.

2 SHEETS—SHEET 1.

WITNESSES:
E. B. Edgar.
J. B. Edgar

INVENTOR
Ellis F. Edgar

UNITED STATES PATENT OFFICE.

ELLIS F. EDGAR, OF WOODBRIDGE, NEW JERSEY.

STEAM-ENGINE.

1,069,607.  Specification of Letters Patent. Patented Aug. 5, 1913.

Application filed December 26, 1908. Serial No. 469,195.

*To all whom it may concern:*

Be it known that I, ELLIS F. EDGAR, citizen of the United States, and resident of Woodbridge, in the county of Middlesex and State of New Jersey, have invented certain new and useful Improvements in Steam-Engines, of which the following is a specification.

Figure 1:
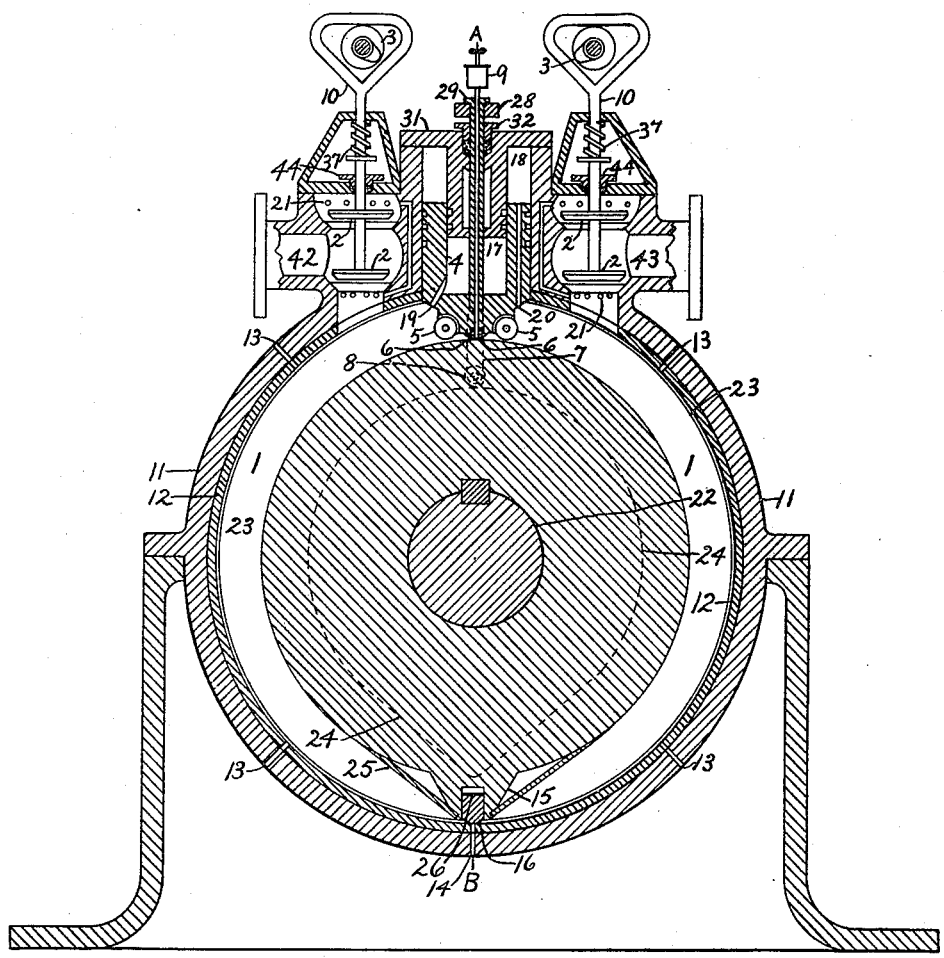
Figure 2:
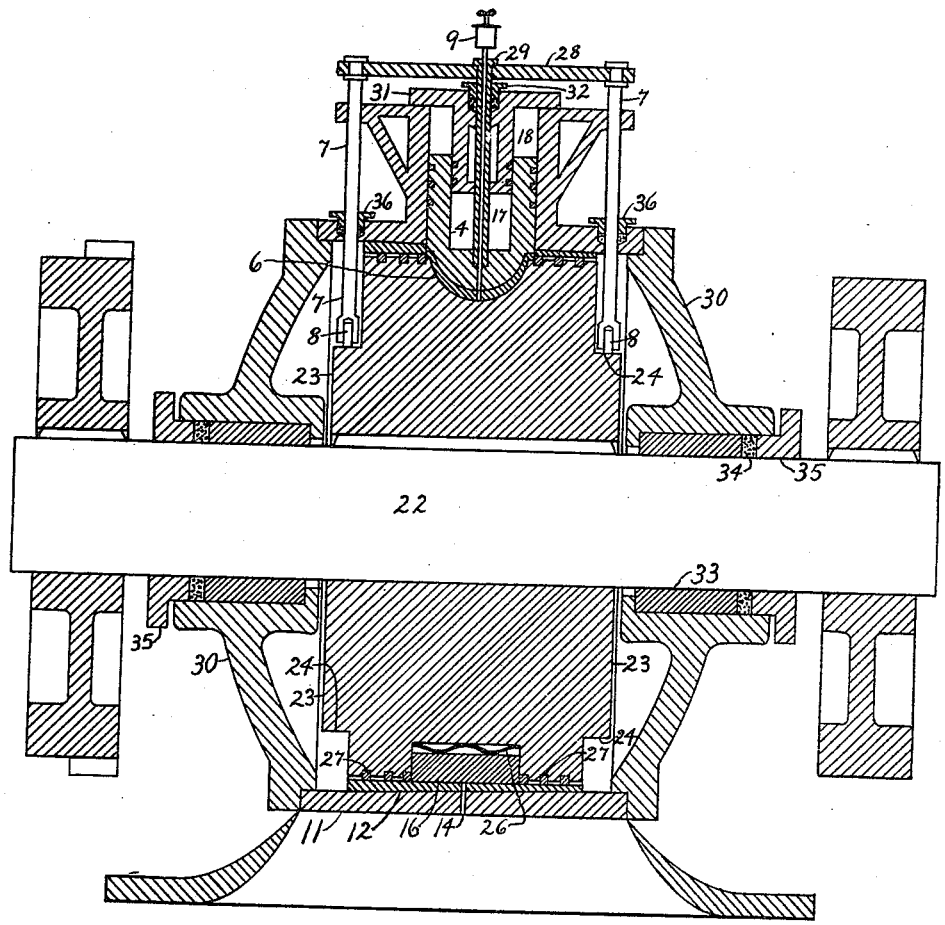

Figure 1 is a section view through a cylinder puppet valve, reciprocating bulk head, piston and piston driving wheel and outside casing of a rotary type of engine. Fig. 2 is a section view of Fig. 1 at line A—B of a rotary type of engine.

In the improvement herein set forth the principal features are a balanced puppet cut-off valve in conjunction with a multiple cam whereby the steam may be let in the cylinder for any desired length of the stroke in starting and cut off automatically at any desired point thereafter and a removable lining and a reciprocating bulkhead as hereinafter set forth.

*Details of construction.*—1, cylinder, 2, puppet cut-off valves, 3, multiple cam, 4, reciprocating bulk head, 5, rollers attached to bulkhead, 6, packing strip of bulkhead, 7, rod for raising bulkhead, 8, roller, 9, oiling device, 10, puppet valve stem, 11, outside casing, 12, removable lining, 13, oiling apertures, 14, condensation drain, 15, piston secured to piston driving wheel, 16, packing strip on face of piston, 17, steam chamber in bulkhead, 18, steam chamber in bulkhead recess, 19, steam channel in steam chamber 17, 20, steam channel in steam chamber 18, 21, steam channels, 22, driving shaft, 23, piston driving wheel, 24, cam track for raising bulkhead, 25, emergency device for raising bulkhead, 26, spring behind piston packing strip, 27, packing strips, 28, cross-arm, 29, bulkhead stem, 30, end casing, 31, bulkhead plug, 32, stuffing box, 33, shaft bearing, 34, packing, 35, collar for tightening packing, 36, stuffing box, 37, spring for closing puppet valves.

*General description.*—I would build this engine preferably in four or more cylinders, whereby a full load may be carried at the same time permitting of an early cut-off to obtain the desired economy as preferably I would not compound the expansions but make one expansion to each cylinder to each inlet of steam. I operate the puppet valve by the multiple cam direct to the valve stem.

Fig. 1 shows a rotary engine with a reciprocating bulkhead between the inlet and exhaust ports and a cylinder located in the outer periphery of the piston driving wheel and a piston secured to said piston driving wheel in said cylinder. The removable lining 12 which is intended to take the wear is placed in the inner side of outside steel casing 11. In oiling apertures 13 I would have in the ends next to the cylinder face aluminum plugs and the other end on the surface of the outside steel casing 11 I would connect to a continuous pipe connecting all these apertures any number there may be to a reservoir for holding the oil which would be subject to an air pressure which would cause the oil to percolate slowly through the aluminum plugs. Oiling device 9 feeds oil to the packing strip on the face of bulkhead 4. This oiling device passes through bulkhead stem 29 which is secured both to the bulkhead 4 and cross head bar 28, said cross head bar 28 being secured to rods 7 which have rollers on their lower end running on cam 24, which causes bulkhead 4 to move in and out of cylinder 1. As a safe guard if anything should happen to this device I have bar 25 extending from the face of the piston 15 to the inner surface of cylinder 1 which would extend under rollers 5 at the bottom of bulkhead 4 and raise said bulkhead up in its pocket or recess and may be pushed back in position again in cylinder 1 by springs or by steam which would enter through channels 19 to steam space 17 when the engine is running in one way and through channels 20 to steam space 18 when the engine is running the other way.

When operated by the steam I would have a safety catch to hold said bulkhead from fitting tight in cylinder 1 holding it with a slight clearance causing the steam tight fit to be accomplished by a spring behind packing strip 6 at the face of bulkhead 4. This would prevent grinding and the rapid wear of packing strip 6 which should be softer than the walls of cylinder 1. Packing strip 16 in the face of piston 15 is held against the face of removable lining 12 by spring 26. Located on each side of packing strip 16 in piston 15 are packing rings 27. These packing rings 27 are set in recesses in the outer periphery of piston driving wheel 23 and also bear against the inner surface of removable lining 12. This combination makes cylinder 1 steam tight. Removable lining 12 should be the softest metal to take the wear as it can be easily replaced.

This engine is designed to utilize high pressure to the best advantage, floor space, first cost, maintenance and economy combined; it is necessary to have an engine of the multiple cylinder type all connected to one driving shaft and pistons so set as to maintain uniform power with an early cut-off, whereby from 40 to 50 expansions of the steam may be obtained. This can be done with this engine at 1000 pounds working pressure. I do not confine myself to the exact form of cylinder shown as I may vary both size and form of cylinder. Steam at 1000 pounds pressure has a temperature of 546 degrees. At this pressure and temperature it is necessary to use a balanced puppet valve and it is necessary to use a multiple cam in conjunction with it to govern the flow of steam to obtain the results set forth.

Having described my invention, what I claim is new and desire to secure by Letters Patent is:

1. A rotary engine composed of a driving shaft, a driving wheel secured thereto, a cylinder located in the outer periphery of said driving wheel, having a piston secured therein, an outer casing surrounding the outer periphery of said driving wheel, said casing having a lining of different material than said casing and removable as set forth, said lining forming the outer side of said cylinder, a reciprocating bulkhead substantially as set forth, located between an inlet port and exhaust port, said inlet port and exhaust port containing balanced puppet valves secured to a valve stem having connections with a multiple cam, all substantially as set forth.

2. A rotary engine composed of a driving shaft, having a series of driving wheels secured thereto, and cylinders located in the outer periphery of said driving wheels, a piston secured in each of said cylinders, an outer casing surrounding the outer periphery of each of said driving wheels, said casings having a removable lining of different material than said casings, said linings forming the outer side of said cylinders, a reciprocating bulkhead substantially as set forth located between the inlet port and exhaust port of each cylinder, said inlet ports and exhaust ports, containing balance puppet valves, secured to valve stems, having connection with multiple cams, all substantially as set forth.

3. A rotary engine composed of a driving shaft a driving wheel secured thereto, a cylinder located in the outer periphery of said driving wheel having a piston secured therein, a reciprocating bulkhead located between an inlet port and an exhaust port, containing balanced puppet cut-off valves secured to a valve stem having connections with a multiple cam all substantially as set forth.

Signed at New York, in the county of New York and State of New York, this 23rd day of Dec. A. D. 1908.

ELLIS F. EDGAR.

Witnesses:
E. B. Edgar,
I. B. Edgar.

Copies of this patent may be obtained for five cents each, by addressing the "Commissioner of Patents, Washington, D. C."